US005959567A

United States Patent [19]
Wolfson et al.

[11] Patent Number: 5,959,567
[45] Date of Patent: Sep. 28, 1999

[54] METHOD AND APPARATUS FOR TRACKING OF ORGANIZED STORMS

[75] Inventors: Marilyn Wolfson, Acton; Barbara Forman, Framingham, both of Mass.; Robert Hallowell, Nashua, N.H.; Michael Moore, Andover, Mass.; Richard Delanoy, Stow, Mass.; Emily Marciniak, Winchester, Mass.

[73] Assignee: Massachusetts Institute of Technology, Cambridge, Mass.

[21] Appl. No.: 08/986,738

[22] Filed: Dec. 8, 1997

[51] Int. Cl.⁶ .................................................. G01S 13/95
[52] U.S. Cl. .............................................................. 342/26
[58] Field of Search ........................ 342/26, 176; 702/3; 706/931; 382/215, 103; 345/429

[56] References Cited

U.S. PATENT DOCUMENTS

| 5,222,155 | 6/1993 | Delanoy et al. | 382/215 |
|---|---|---|---|
| 5,751,289 | 5/1998 | Myers | 345/429 |

OTHER PUBLICATIONS

Browning, K.A., "The Frontiers plan: a strategy for using radar and satellite imagery for very–short–range precipitation forecasting," *The Meteorological Magazine,* vol. 108, No. 1283, 1979, pp. 161–184.

Wilson, J.W., "Movement and Predictability of Radar Echoes," U.S. Department of Commerce/Environmental Science Services Administration, Technical Memorandum, Nov. 1966, pp. 1–30.

Denoeux et al., "Determination in Real Time of the Reliability of Radar Rainfall Forecasts," *Journal of Hydrology,* vol. 122, 1991, pp. 353–371.

Bohne, et al., "Short Term Forecasting of Cloud and Precipitation," AFGL–TR–88–0032, Environmental Research Papers, No. 994, 1988, pp. 1–94.

Mielke et al., "An Analysis of Radar Echo Systems for Upper Midwestern United States," Department of Meteorology, University of Wisconsin, vol. 16, 1977, pp. 833–843.

Austin, G.L., "Application of Pattern–Recognition and Extrapolation Techniques to Forecasting," *ESA Journal,* vol. 9, 1985.

Browning, et al., "On the Forecasting of Frontal Rain Using a Weather Radar Network," *Monthly Weather Review,* vol. 110, 1982, pp. 534–552.

Bellon et al., "Forecasting of hourly accumulations of precipitation by optimal extrapolation of radar maps," *Journal of Hydrology,* vol. 157, 1994, pp. 211–233.

Wilson, et al., "State–of–the–art of Nowcasting Thunderstorms," Convective Weather Forecasting Workshop, 7th Conf. on Aviation, Range, and Aerospace Meteorology, American Meteorology Society, Long Beach, CA, 1997.

Chornoboy et al., "Automated Storm Tracking for Terminal Air Traffic Control," *The Lincoln Laboratory Journal,* vol. 7, No. 2, 1994, pp. 427–448.

Delanoy et al., "Functional Templates and Their Application to 3–D Object Recognition," *Proc. Intl. Conf. on Acoustics, Speech, and Signal Processing,* San Francisco, 1992.

Delanoy et al., "Machine Intelligent Gust Front Detection," *The Lincoln Laboratory Journal,* vol. 6, 1994, pp. 187–212.

*Primary Examiner*—Daniel T. Pihulic
*Attorney, Agent, or Firm*—Testa, Hurwitz & Thibeault, LLP

[57] ABSTRACT

A method and apparatus for tracking of organized storms using weather radar images. An image filter approximating the envelope of the organized storm radar image is used to improve tracking of the large scale storm features. The image filter is repeatedly rotated to different orientations at each point in the weather radar images to produce filtered images. The filtered images are provided to an image tracker to generate an array of track vectors. Application of the array of track vectors to the unfiltered image generates a predicted weather radar image.

24 Claims, 7 Drawing Sheets

FIG. 1

FIG. 2a
ELLIPTICAL FILTER AT 0 DEG.

FIG. 2b
ELLIPTICAL FILTER AT 45 DEG.

FIG. 3
UNFILTERED WEATHER RADAR IMAGE

FIG. 4
FILTERED WEATHER RADAR IMAGE

FIG. 5
TRACK VECTORS

FIG. 6
PREDICTED WEATHER RADAR IMAGE

FIG. 7
FLOWCHART OF METHOD OF TRACKING AN ORGANIZED STORM

METHOD AND APPARATUS FOR TRACKING OF ORGANIZED STORMS

GOVERNMENT INTEREST

The subject matter described herein was supported in part by the Federal Aviation Administration under contract No. DTFA01-91-Z-02036.

FIELD OF THE INVENTION

The invention relates generally to a method and apparatus for the tracking of organized storms. In particular, the invention relates to a method and apparatus for tracking propagating organized storms having growing and decaying convective features using processed weather radar images.

BACKGROUND OF THE INVENTION

Short term weather predictions (e.g., 30–120 minutes) of the location of storms are extremely important to many sectors of the population. For example, aviation systems, traffic information systems, power companies and commuters realize important safety and economic benefits from accurate predictions of organized storms. Unfortunately, the classic weather problem of determining the motion of organized storms has not led to accurate automated forecasts for the short term time scale.

Organized storms are large scale meteorological events, often resulting from frontal discontinuities or cyclonic disturbances. Organized storms include clusters or groups of cells which occur alone or in larger line storms, hurricanes, tropical storms or in association with low pressure centers. Large single cells, including hailstorms, tornadic cells, and supercells, are also considered organized storms due to their longer lifetime and broader geographic range. Conversely, airmass storms are small scale, unorganized convective elements of limited duration and geographic range. Any convective element (i.e., cell) can be categorized as part of an organized storm or an individual airmass storm.

The storm tracking community has attempted for years to determine not only storm advection (i.e., the horizontal motion due to air currents) but also the growth and decay of the organized storm with no significant success. The lifetime of individual cells within the organized storm can be 20 minutes or less. New cells frequently grow near old decaying cells, but not necessarily along the direction of motion of the old cells. As a result of this discrete propagation (i.e., growth and decay process), storm motion can appear to deviate from cellular advection. For short term predictions (e.g., 20 minutes or less), the tracking of cell motion yields accurate predictions. Longer term predictions (e.g., greater than 20 minutes) based on the tracking of cell motion are considerably less accurate. Instead, a prediction of the envelope of the organized storm is desirable.

SUMMARY OF THE INVENTION

A principle discovery of the invention is a method of tracking the large scale motion (i.e., envelope) of an organized storm to improve short term (e.g., 30–120 minute) forecast accuracy. The method exploits the scientific principle that large scale storms tend to decorrelate less rapidly with time. While the cell motion is accurate for shorter term predictions, longer term predictions require tracking of the storm envelope. Thus, the method is directed towards determining the large scale motion separate from the individual cell motion. By taking weather radar data from organized storms, filtering it to obtain only the large scale features and tracking the motion of the large scale features, the motion of the envelope can be determined. Therefore, an image filter that approximates the storm envelope is preferred.

The method includes receiving a group of weather radar images. In one embodiment, the method also includes the step of obtaining the group of images. Each image represents the organized storm during a period of time. The organized storm can be a line storm or any other organized group of cells. The group of images typically represents sequential periods of time.

At least one image filter is applied to each weather radar image to generate at least one filtered weather radar image. The image filter has an aspect ratio that is not equal to one and is similar to the envelope of the organized storm. In one embodiment, the image filter is a kernel with elements matching the approximate shape of the organized storm in at least one of the weather radar images. The kernel elements can define a shape that approximates an ellipse or rectangle. The elliptical or rectangular shape can have an aspect ratio of about four to one. At each point in the image where the filter kernel is applied, the kernel is incrementally rotated through a predetermined angular range. In one embodiment, the angular range is 180°. The value chosen for each point in the filtered image is the maximum of the values resulting from application of all the kernel rotations at that point.

The filtered images are provided to an image tracker to generate an array of track vectors. In one embodiment, the image tracker is a correlation tracker which correlates successive local image segments of the filtered images to generate the array of track vectors. The track vectors are then applied to one of the unfiltered weather radar images to generate a predicted weather radar image of the organized storm at a later time.

The invention also relates to an apparatus for predicting the motion of an organized storm. The apparatus includes an input module, a filter module, a tracker module and an advection module. The apparatus can also include an acquisition module which obtains weather radar images and provides them to the input module. The input module is adapted to receive multiple weather radar images representing the organized storm during periods of time. The group of images typically represents sequential periods of time. The filter module applies an image filter, or a set of image filters, to each image and generates one or more filtered weather radar images. The image filter includes a representation of a shape similar to the envelope of the organized storm where the aspect ratio of the shape is not equal to one. In one embodiment, the image filter is a kernel with elements describing the approximate shape of the organized storm in at least one of the weather radar images. In another embodiment, the kernel defines a shape that is approximately elliptical or rectangular. In another embodiment, the elliptical or rectangular shape has an aspect ratio of about four to one. At each point in the image where the filter kernel is applied, the kernel is incrementally rotated through a predetermined angular range. In one embodiment, the angular range is 180°. The value chosen by the filter module for each point in the filtered image is the maximum of the values resulting from application of all the kernel rotations at that point. The tracker module processes the filtered images and generates an array of track vectors. In one embodiment, the tracker module correlates successive local image segments of the filtered images to generate the track vectors. The advection module then applies the array of track vectors to one of the unfiltered weather radar images to generate a predicted weather radar image.

DETAILED DESCRIPTION

Figure 1:
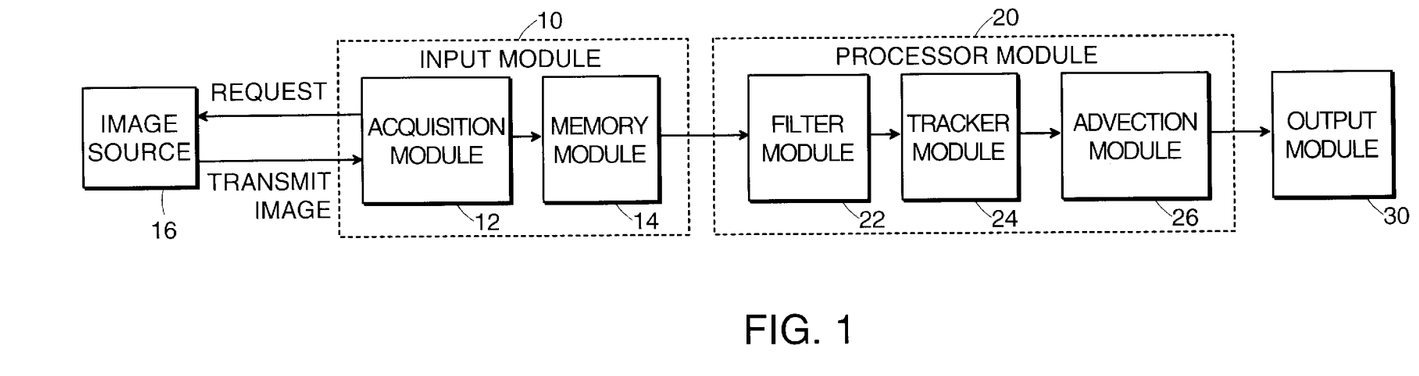
FIG. 1 is a block diagram of an apparatus for predicting the motion of an organized storm.

FIG. 1 shows a functional block diagram of an apparatus for predicting the motion of an organized storm. An input module 10 receives weather radar image data from a weather radar image source 16. The input module 10 provides the image to a processor module 20 which generates a predicted weather radar image available at an output module 30.

The input module 10 includes an acquisition module 12 and a memory module 14 to receive and store weather radar images for processing by the processor module 20. The acquisition module 12 initiates transfer of weather radar images from the image source 16 (e.g., remote computer system, satellite receiver and processor, Internet server or other device capable of transmitting weather radar images). The memory module 14 is any device capable of temporary or permanent storage of the weather radar image.

A processor module 20 includes a filter module 22, a tracker module 24 and an advection module 26. The processor module 20 receives multiple weather radar images from the memory module 14 and generates a predicted weather radar image available at output module 30. The filter module 22 applies an image filter 50 (FIGS. 2a–2b) to each weather radar image received from memory module 14 to create a filtered image. The filtered images are transferred to the tracker module 24 which generates track information on the motion of successive local image areas. An advection module 26 applies the track information to one of the unfiltered weather radar images stored in the memory module 14 to generate a predicted weather radar image. The predicted image is available at the output module 30.

Figure 2A:
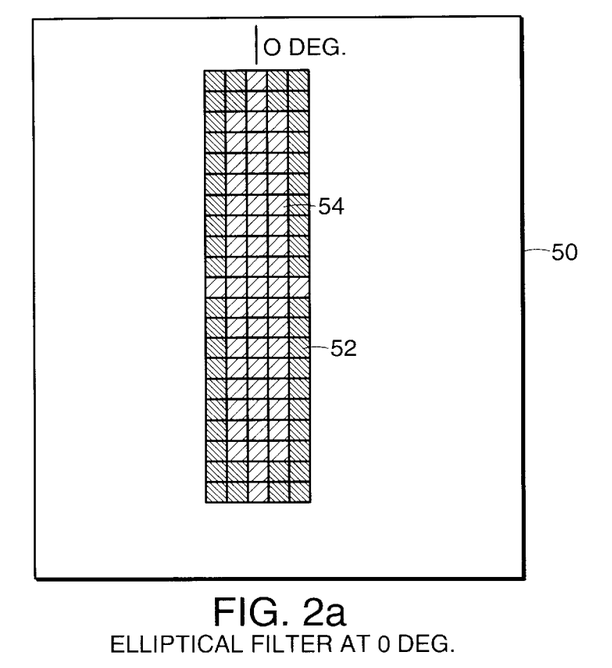
FIGS. 2a and 2b are image filter kernel elements for an elliptical template at 0° and 45°, respectively.
Figure 2B:
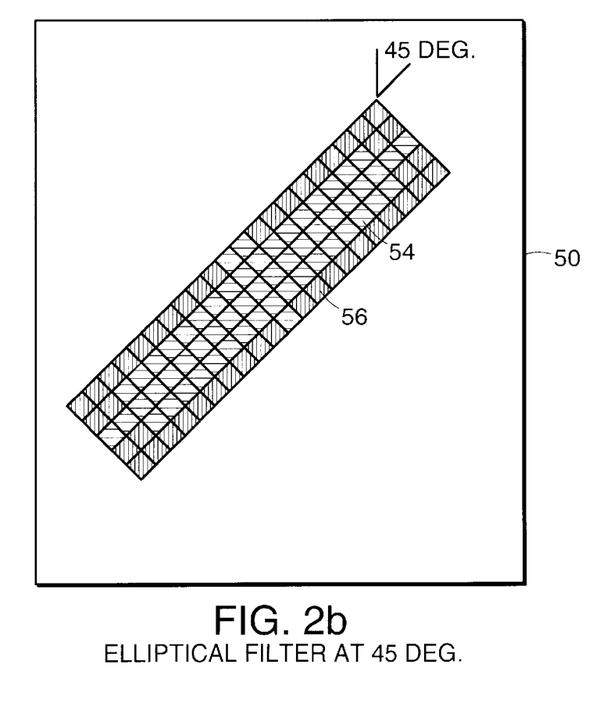

FIG. 2a shows an example of an image filter 50 having an elliptical template 52 with an aspect ratio of about 4:1 as defined by pixels 54. The image filter 50 can employ other template forms, however, the selected template is closely matched to the envelope of the organized storm. Because storms often organize into lines, the utilization of an elliptical template 52 is often optimal. The template 52 can be rotated within the image filter 50, resulting in a rotated template 56 as depicted in FIG. 2b. Rotation is typically necessary to achieve a template orientation that is optimally matched to the orientation of the envelope of the organized storm.

Figure 3:
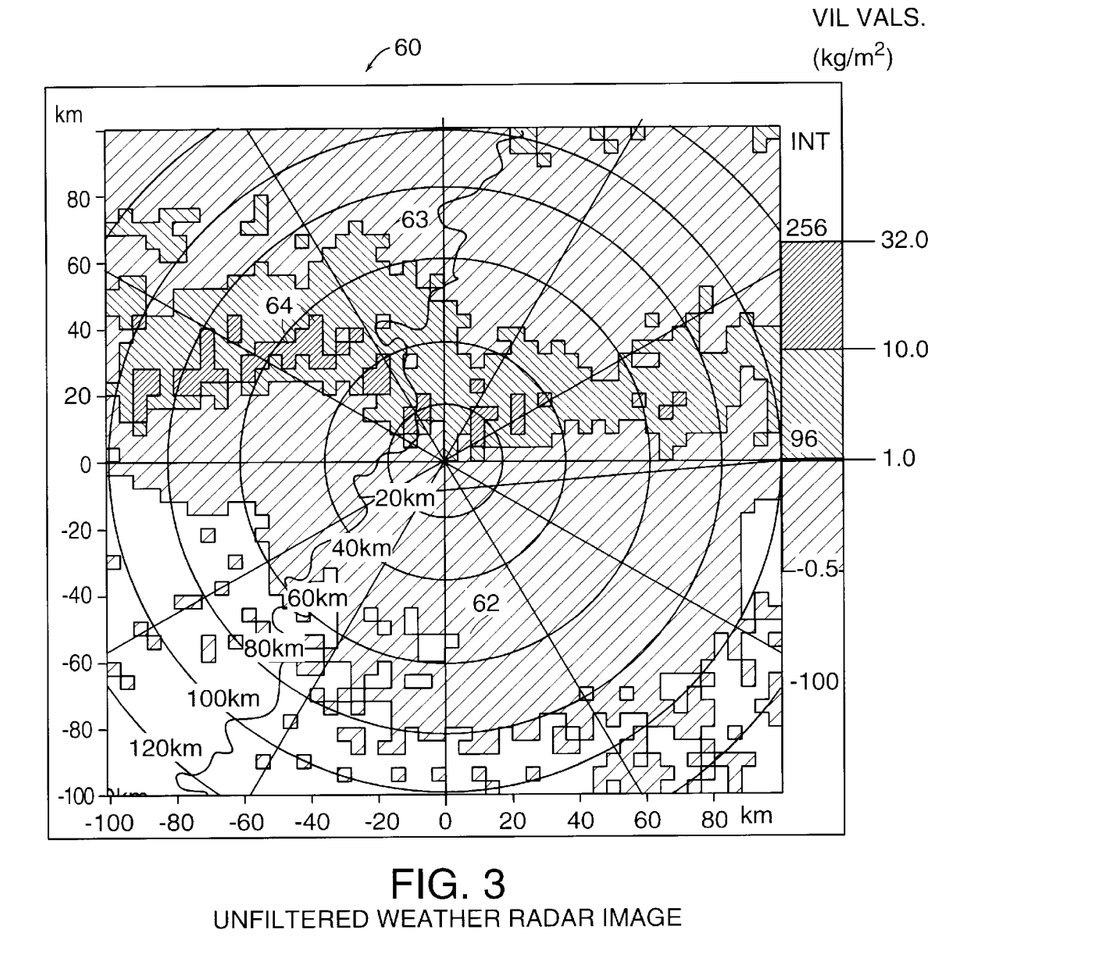
FIG. 3 is an illustration of an unfiltered weather radar image.

Referring to FIG. 3, an unfiltered weather radar image 60 indicates regions of varying intensity 62, 63 and 64. Intensity values typically represent vertical integrated liquid water (VIL), but can also represent raw reflectivity. Low intensity regions 62 have VIL values less than 1 kg/m² and indicate insignificant precipitation. Moderate intensity regions 63 have VIL values between 1 kg/m² and 10 kg/m². Precipitation in these regions would be noticeable. High intensity regions have VIL values greater than 10 kg/m² and indicate heavy precipitation. The high intensity regions (or cells) 64 correspond to areas of convective activity with lifetimes typically 20 minutes or less. The image filter 50 is applied to each pixel in the weather radar image 60 for a series of template orientations defined by an incremental rotation angle. For example, an increment of 10° can be used resulting in 18 different elliptical template orientations. The image filter 50 is designed to return a large value when the underlying image nearly matches the elliptical template 56. The maximum value at each pixel resulting from the application of all orientations of the template 56 is retained.

Figure 4:
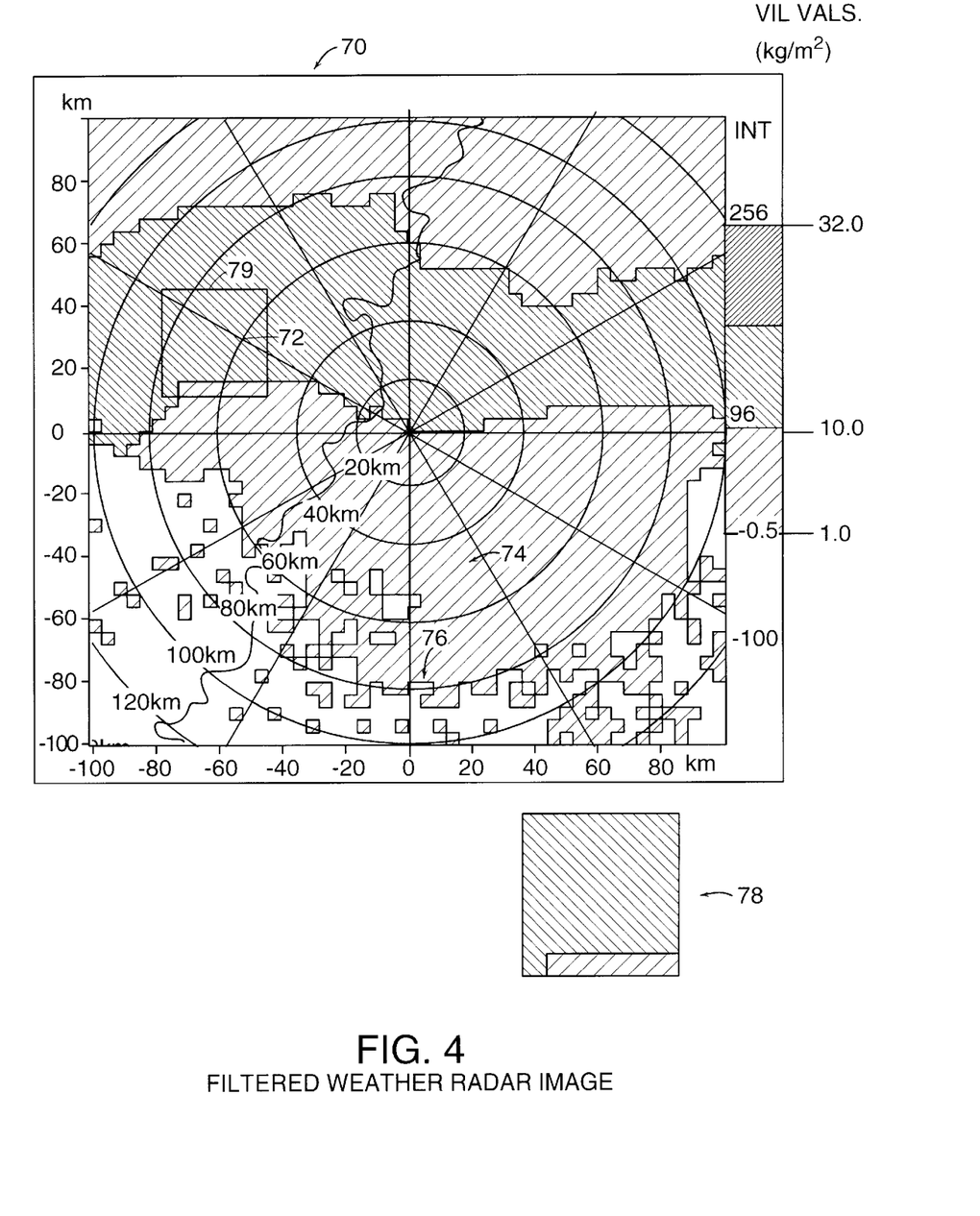
FIG. 4 is an illustration of a weather radar image after application of an image filter.

FIG. 4 shows a filtered weather image 70 defined by the array of maximum pixel values returned by the filtering process. The filtered image 70 includes regions of moderate intensity 72 and light intensity 74. The boundary 76 of the light intensity region 74 approximates the envelope of the storm, however, the small scale high intensity features 64 of the unfiltered image 60 are no longer apparent. Once the image filter 50 has been applied to each weather radar image 60, the resulting filtered image 70 is passed to the tracker module 24.

Figure 5:
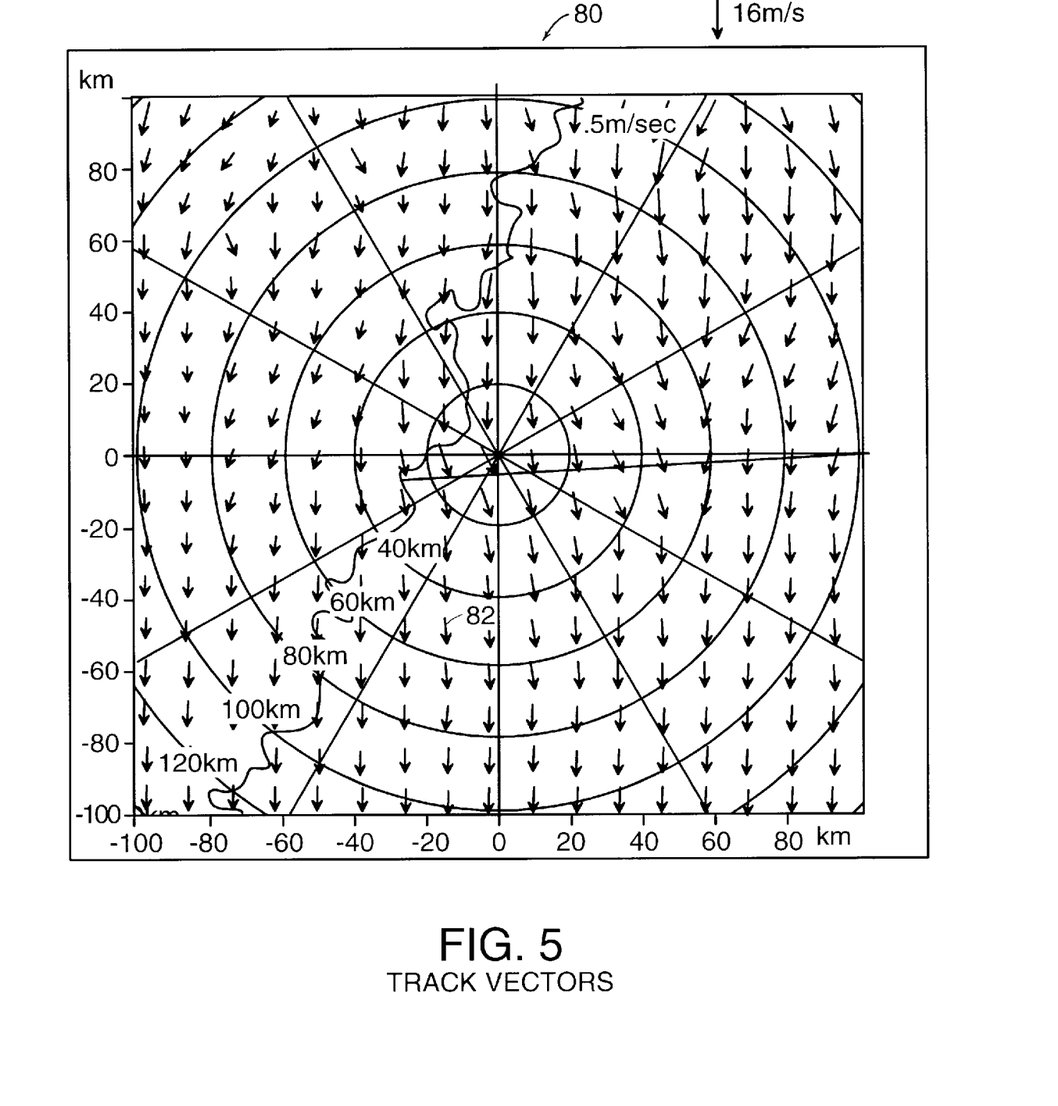
FIG. 5 is a graphical representation of track vectors generated by an image tracker.
Figure 6:
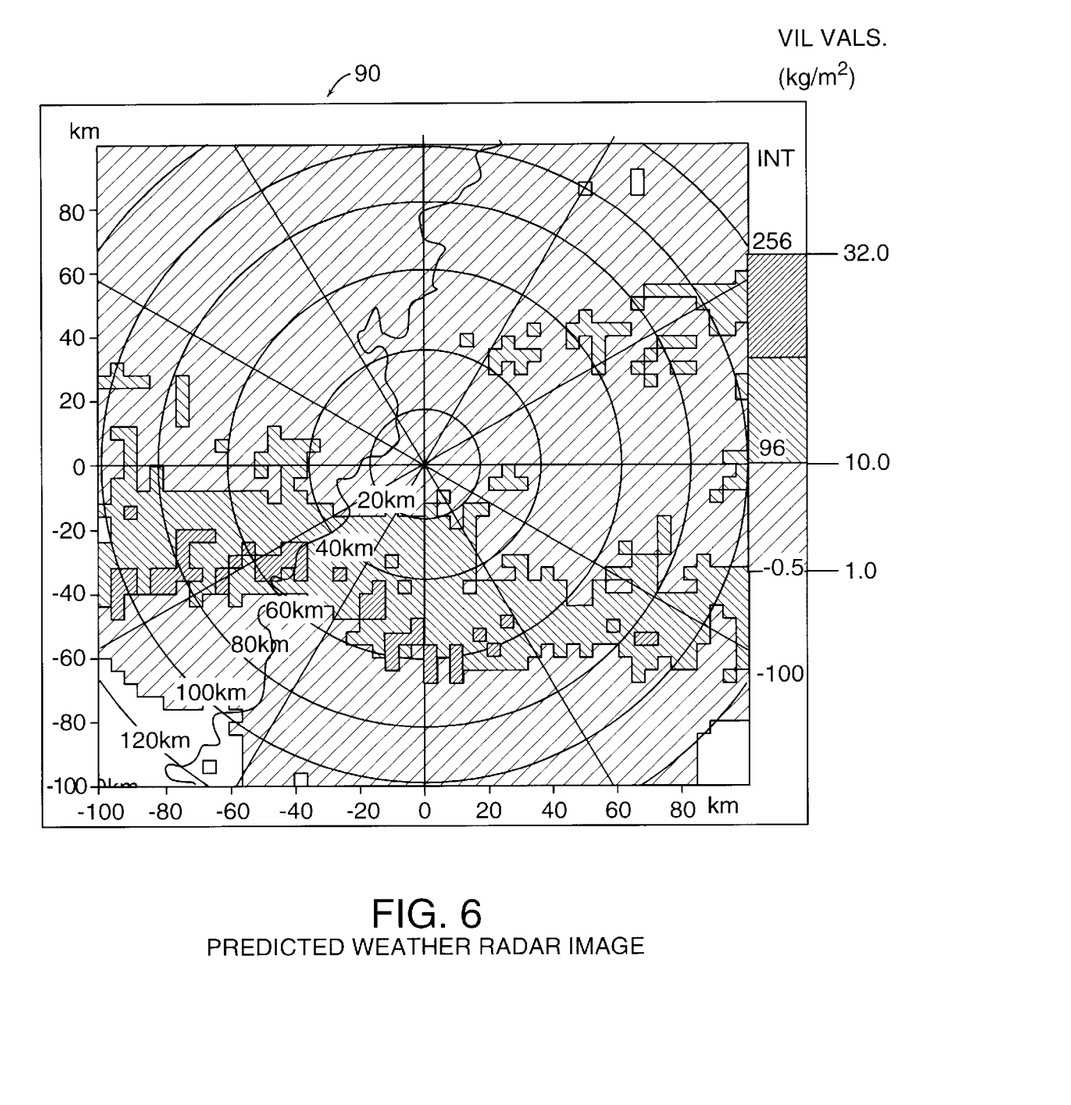
FIG. 6 is an illustration of a predicted weather radar image.

FIG. 5 shows an array 80 of track vectors 82 describing the local motion of the storm occurring during the time interval between images 60. The array 80 generated by the tracker module 24 is the result of correlating a local subimage of a prior filtered image 70 with a subimage 79 of a more recent filtered image 70. Referring to FIG. 6, the track vectors 82 are then applied by the propagation module 26 to one of the unfiltered weather radar images 60 to generate a predicted weather radar image 90 of the organized storm.

Figure 7:
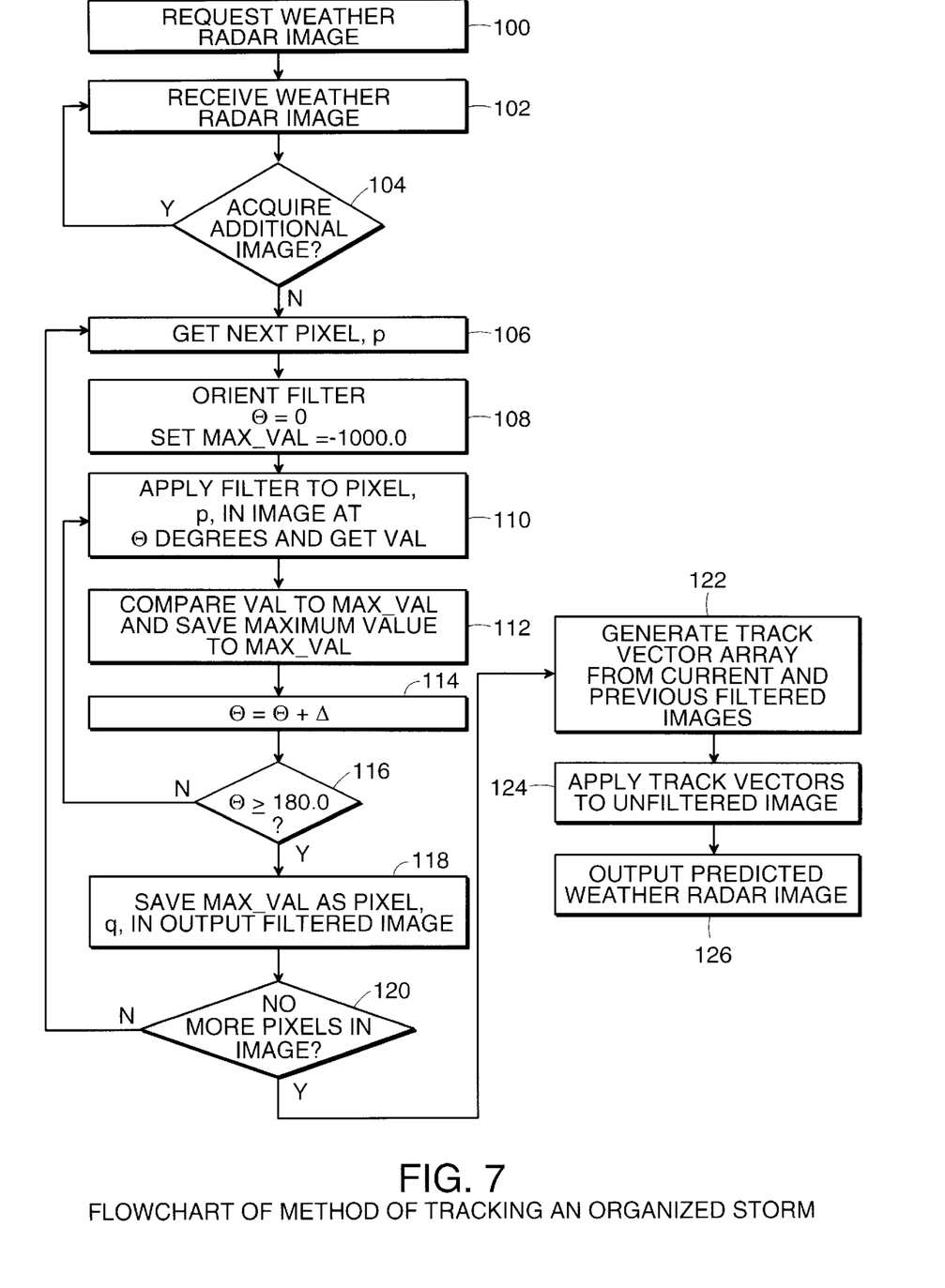
FIG. 7 is a flowchart of a method for predicting the motion of an organized storm.

The flowchart in FIG. 7 describes one implementation of the invention as a series of method steps. At step 100, a request for transfer of a weather radar image is made to an image provider and, at step 102, a weather radar image is received. Step 104 determines if additional images must be obtained. If additional images are required, steps 100 and 102 are repeated. At step 106, the method is applied to the first unfiltered image pixel p. At step 108, the filter orientation angle θ is initialized at 0° (i.e., no rotation with respect to the unfiltered image) and the filtered image is initialized at all points to a physically unrealizable value (e.g., −1000). In step 110, the filter oriented at θ is applied to the current point p in the unfiltered image and a value VAL is calculated. At step 112, VAL is compared with the previously stored maximum value MAX_VAL for the point in the unfiltered image and the greater of the two values is saved as MAX_VAL. At step 114, the filter orientation angle θ is increased by an incremental angle Δ. At step 116, if θ is less than 180°, the method returns to step 110. However, if θ is at least 180°, the method proceeds to step 118 and MAX_VAL is saved as the value for the corresponding pixel p' in the filtered image. In step 120, the method is directed back to step 106 if there are still unprocessed pixels in the unfiltered image. However, if all pixels in the unfiltered image have been processed, the method continues to step 122 where an array of track vectors is generated from the previous and current filtered images. At step 124, the array of track vectors is applied to one of the unfiltered images to advect the unfiltered image to a future time (i.e., generate a predicted image). At step 126, the predicted weather radar image is provided to an output device for viewing or transmission.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for predicting the motion of an organized storm, comprising the steps of:
   a) receiving a plurality of weather radar images each being representative of the organized storm during a period of time;
   b) applying one or more image filters to each of the plurality of weather radar images to generate one or more filtered weather radar images, wherein the filter has an aspect ratio not equal to one and is substantially matched to the organized storm;
   c) providing the filtered weather radar images to an image tracker to generate an array of track vectors; and
   d) applying the array of track vectors to a selected unfiltered weather radar image to generate a predicted weather radar image of the organized storm.

2. The method of claim 1 wherein the image tracker correlates local image segments of the filtered weather radar images to generate the array of track vectors.

3. The method of claim 1 wherein the image filter is a kernel having elements arranged substantially to match the shape of the organized storm in one or more of the weather radar images.

4. The method of claim 3 wherein the kernel elements define a shape that is substantially elliptical or rectangular.

5. The method of claim 4 wherein the ellipse or rectangle has an aspect ratio of about 4:1.

6. The method of claim 3 wherein step b) further comprises the step of rotating the image filter in kernel coordinate space before applying the image filter to the plurality of weather radar images.

7. The method of claim 6 wherein step b) further comprises the step of rotating the image filter in kernel coordinate space through 180 degrees at every point in each weather radar image and saving the maximum value at each point as the corresponding point in the filtered weather radar image.

8. The method of claim 1 wherein the plurality of weather radar images are representative of the organized storm for sequential periods of time.

9. The method of claim 1 wherein step a) further comprises the step of obtaining the plurality of weather radar images.

10. A method for predicting the motion of a line storm, comprising the steps of:
    a) receiving a plurality of weather radar images each being representative of the line storm during a period of time;
    b) applying one or more image filters to each of the plurality of weather radar images to generate one or more filtered weather radar images, wherein the filter has an aspect ratio not equal to one and is a kernel having elements arranged substantially to match the shape of the line storm in one or more of the weather radar images;
    c) providing the filtered weather radar images to an image tracker to generate an array of track vectors; and
    d) applying the array of track vectors to a selected unfiltered weather radar image to generate a predicted weather radar image of the line storm.

11. The method of claim 10 wherein the image tracker correlates local image segments of the filtered weather radar images to generate the array of track vectors.

12. The method of claim 10 wherein the kernel elements define a shape that is substantially elliptical or rectangular.

13. The method of claim 12 wherein the ellipse or rectangle has an aspect ratio of about 4:1.

14. The method of claim 10 wherein step b) further comprises the step of rotating the image filter in kernel coordinate space before applying the image filter to the plurality of weather radar images.

15. The method of claim 14 wherein step b) further comprises the step of rotating the image filter in kernel coordinate space through 180 degrees at every point in each weather radar image and saving the maximum value at each point as the corresponding point in the filtered weather radar image.

16. An apparatus for predicting the motion of an organized storm, comprising:
    a) an input module for receiving a plurality of weather radar images each being representative of the organized storm during a period of time;
    b) a filter module for applying an image filter to each of the plurality of weather radar images and generating one or more filtered weather radar images, wherein the filter has an aspect ratio not equal to one and is substantially matched to the organized storm;
    c) a tracker module for processing the filtered weather radar images and generating an array of track vectors; and
    d) an advection module for applying the array of track vectors to a selected unfiltered weather radar image to generate a predicted weather radar image of the organized storm.

17. The apparatus of claim 16 wherein the tracker module correlates local image segments of the filtered weather radar images to generate the array of track vectors.

18. The apparatus of claim 16 wherein the image filter is a kernel having elements arranged substantially to match the shape of the organized storm in one or more of the weather radar images.

19. The apparatus of claim 18 wherein the kernel elements define a shape that is substantially elliptical or rectangular.

20. The apparatus of claim 19 wherein the ellipse or rectangle has an aspect ratio of about 4:1.

21. The apparatus of claim 18 wherein the filter module rotates the image filter in kernel coordinate space before applying the image filter to the plurality of weather radar images.

22. The apparatus of claim 21 wherein the filter module rotates the image filter in kernel coordinate space through 180 degrees at every point in each weather radar image and saves the maximum value at each point as the corresponding point in the filtered weather radar image.

23. The apparatus of claim 16 wherein the plurality of weather radar images are representative of the organized storm for sequential periods of time.

24. The apparatus of claim 16 further comprising an acquisition module for obtaining the plurality of weather radar images.

* * * * *